United States Patent
Archenhold et al.

(10) Patent No.: US 6,963,175 B2
(45) Date of Patent: Nov. 8, 2005

(54) ILLUMINATION CONTROL SYSTEM

(75) Inventors: Geoffrey Howard Gillett Archenhold, Walsall (GB); Keith Anderson, Walsall (GB)

(73) Assignee: Radiant Research Limited, Birmingham (GB)

( * ) Notice: Subject to any disclaimer, the term of this patent is extended or adjusted under 35 U.S.C. 154(b) by 0 days.

(21) Appl. No.: 10/229,721

(22) Filed: Aug. 28, 2002

(65) Prior Publication Data

US 2003/0057888 A1 Mar. 27, 2003

(30) Foreign Application Priority Data

Aug. 30, 2001 (GB) .............................................. 0120966

(51) Int. Cl.$^7$ .............................................. H05B 37/02
(52) U.S. Cl. ...................... 315/291; 315/246; 315/299
(58) Field of Search ................................. 315/246, 291, 315/299, 307–308; 362/227, 230–231, 276, 800

(56) References Cited

U.S. PATENT DOCUMENTS

| | | | |
|---|---|---|---|
| 4,149,071 A | 4/1979 | Nagai et al. ................ 398/209 |
| 4,797,640 A | 1/1989 | Heard ........................ 359/238 |
| 5,598,068 A | 1/1997 | Shirai ..................... 315/185 R |
| 5,793,621 A | * 8/1998 | Yamada ....................... 363/21 |
| 6,883,929 B2 | * 4/2005 | Dowling ..................... 362/192 |
| 2002/0048169 A1 | * 4/2002 | Dowling et al. ............ 362/234 |
| 2002/0070914 A1 | * 6/2002 | Bruning et al. ............. 345/102 |
| 2003/0028260 A1 | * 2/2003 | Blackwell ................... 700/18 |
| 2003/0057884 A1 | * 3/2003 | Dowling et al. ............ 315/291 |
| 2003/0214259 A9 | * 11/2003 | Dowling et al. ............ 315/312 |

FOREIGN PATENT DOCUMENTS

| | | |
|---|---|---|
| EP | 0553867 A | 8/1993 |
| EP | 0625843 A | 11/1994 |
| GB | 254832 A | 3/1988 |
| GB | 2346004 | 7/2000 |
| JP | 08149072 | 6/1996 |
| WO | WO0182657 | 1/2001 |
| WO | WO0199475 | 12/2001 |

* cited by examiner

Primary Examiner—Thuy Vinh Tran
(74) Attorney, Agent, or Firm—Myron Greenspan, Esq.; Lackenbach Siegel LLC

(57) ABSTRACT

A light emitting diode illumination control system is disclosed for driving a current circuit for energizing one or more LED light sources. The system comprises a control system including a microprocessor arranged to control a pulse amplitude modulated (PAM) voltage controlled current circuit, and may employ a monitor for monitoring at least one ambient condition and a microprocessor operable to control the current circuit in response to the monitored condition.

20 Claims, 15 Drawing Sheets

(a)

(b)

ILLUMINATION CONTROL SYSTEM

BACKGROUND OF THE INVENTION

1. Field of the Invention

The present invention relates to a lighting control system for providing single or multicoloured illumination using microprocessor controlled, pulsed amplitude modulated (PAM) light emitting sources such as Light Emitting Diodes (LED). More particularly, the present invention is a method and apparatus for providing illumination control and which may for example optionally include temperature compensation to maintain light output and increase operating lifetimes throughout a wide range of operating temperatures.

2. Description of the Invention

Conventional illumination systems have been used for many years in general lighting and in lighting for decoration, advertising, warning, guidance and entertainment applications. Such illumination systems utilise a variety of light sources, including but not limited to incandescent, Halogen and Fluorescent types, which are subject to many drawbacks. For example, halogen and incandescent light sources produce undesirable heat and are limited to producing only white or yellow light. Therefore, in order to produce colours at different wavelengths, lighting systems based on these light sources may require substantial lens and filtering systems, which reduces desirability and increases costs significantly. These conventional sources may also have limited longevity with lifetimes significantly less than a few thousand hours. Such sources are also susceptible to breakage in high shock and vibration prone environments.

Light Emitting Diode (LED) sources have recently undergone significant advances, which enables them to be a cost effective replacement for conventional light sources. LED light sources offer significant benefits over conventional light sources as they consume less electrical energy for a given light intensity while exhibiting much longer lifetimes. Other desirable properties of LEDs include high resistance to shock or vibration, low heat dissipation, very fast switching response times and a wide choice of illuminating colours.

However, there are different issues to consider when using LEDs where conventional lamps have historically been used. Primarily, LEDs are heat-sensitive devices and, therefore, heat generated during operation of the LEDs and associated components must be dissipated adequately to ensure a reliable operation over extreme environmental temperature ranges. The life expectancy of an LED lighting system would be significantly reduced or complete failure could occur if environmental conditions were not used as a feedback control to reduce the operating parameters of the LEDs within such a system. Also, the majority of LED light sources have limited illumination spectra about a particular wavelength making it difficult to produce a wide colour spectrum that responds to the characteristics of the human eye. Many such LED based lighting systems have been proposed to enable colour mixing using three primary colours usually with illumination spectrums at wavelengths corresponding to Red (605 to 635 nm), Green (530 to 570 nm) and Blue (455 to 490 nm). However, these systems have a poor colour rendering index compared to conventional light sources and therefore objects illuminated from these systems do not appear pleasing to the human eye. Many of these systems use a Pulse Width Modulation (PWM) technique which operates a current controlled current source to control the current through the LED devices however, systems based on the PWM technique are more likely to generate radio frequency interference (RFI) and careful design criteria is required to reduce RFI, increasing the complexity and the number of components within such systems. Variations in the pulse width of the output used to drive the LED loads are also unacceptable in, for example, high-speed inspection systems which utilise solid state camera systems such as Charge Coupled Device (CCD) or Complementary Metal Oxide Semiconductor (CMOS) image sensors.

SUMMARY OF THE INVENTION

According to the present invention there is provided a light emitting diode illumination system arranged to drive one or more light emitting diode light sources which comprises a control system including a microprocessor arranged to control a pulse amplitude modulated (PAM) voltage controlled current circuit.

The present invention provides an alternative choice for driving a single light source or alternatively a plurality of light sources, using a pulse amplitude modulated pulse train to operate a voltage controlled current source that may optimise illuminated light output. The illumination control system of the present invention provides a pulse generator that is more efficiently designed and requires fewer components to compensate against noise generated from RFI than currently used PWM systems and may incorporate a temperature compensation technique to maintain light output and increase operating lifetimes throughout a wide range of operating temperatures.

The system may be arranged to control a plurality of light sources which are adapted, inter se, to emit light within different wavelength bands. For example, the light sources may be, inter se, adapted to emit substantially monochromatic light centred on at least three different wavelengths.

Means is preferably provided for modifying and controlling the pulse amplitude modulation signal timing period and duty cycle. This can readily be achieved by using, for example, a microprocessor, discrete electrical component circuit, fixed or programmable crystal oscillator, or integrated circuit timer.

In preferred embodiments of the invention, means is included for providing a voltage for modulating pulse amplitude.

It is especially convenient to provide a voltage divider such as a programmable digital potentiometer for modulating pulse amplitude.

In preferred embodiments, a current feedback monitor is provided for monitoring current driving the light source(s). The current feedback monitor may comprise a discrete electrical circuit or a current sensing integrated circuit.

In especially preferred embodiments of the invention, the system comprises a monitor for monitoring at least one ambient condition and a microprocessor adapted to control the current circuit in response to the monitored condition. Such embodiments afford considerable practical advantages in the field of lighting control, and this feature is itself believed to be new, at least in the field of LED lighting.

Such a monitor may comprise a transducer arranged to monitor any desired form of energy exhibited in its neighbourhood. Thus, radiant, mechanical, thermal, electrical, magnetic and chemical energy monitors may be used. As specific examples of such monitors, the following may be mentioned: temperature sensors, displacement detectors, angular sensors, velocity sensors, strain sensors, acceleration sensors, photo-emissive detectors, photo-conductive detectors, photo-voltaic detectors, pressure sensors, flow transducers, radiation sensors, chemical sensors, gas detectors.

A communications module is suitably provided to serve as a data connection interface to an internal or external controlling device. Such a communications module may use a transmission system such as radio frequency, infrared, ethernet, internet, DMX512-compatible or others.

Preferably, the system comprises means for receiving an external signal and controlling the frequency and duty cycle of the pulse amplitude modulation control signal in synchronism with that external signal.

It is especially preferred that such an external signal should be passed from a solid state camera system. In this way, the camera may be synchronised with the pulses driving the light source so that the camera will always pick up a true colour balance from a set of multiple light sources driven by the system.

A lighting or display system using the present invention may be used in many different ways. Examples of uses of the present invention are as follows:

Architectural lighting, Display lighting, Point of Sale lighting, Theatre lighting, TV Studio lighting, (applied to both indoor and outdoor), amenity lighting, domestic lighting, emergency lighting, automotive lighting, traffic control systems, machine vision lighting, back lighting, medical operating theatre lighting, task lighting, microscopy illumination, instrumentation lighting, endoscope lighting, fibre optic lighting.

Specific embodiments of the invention will now be described by way of examples with reference to the accompanying drawings in which:

BRIEF DESCRIPTION OF THE DRAWINGS

FIG. 13$b$ is a graph illustration the forward DC current verses the ambient temperature for a typical blue or green, InGan LED.

DETAILED DESCRIPTION OF THE PREFERRED EMBODIMENTS

Figure 1:
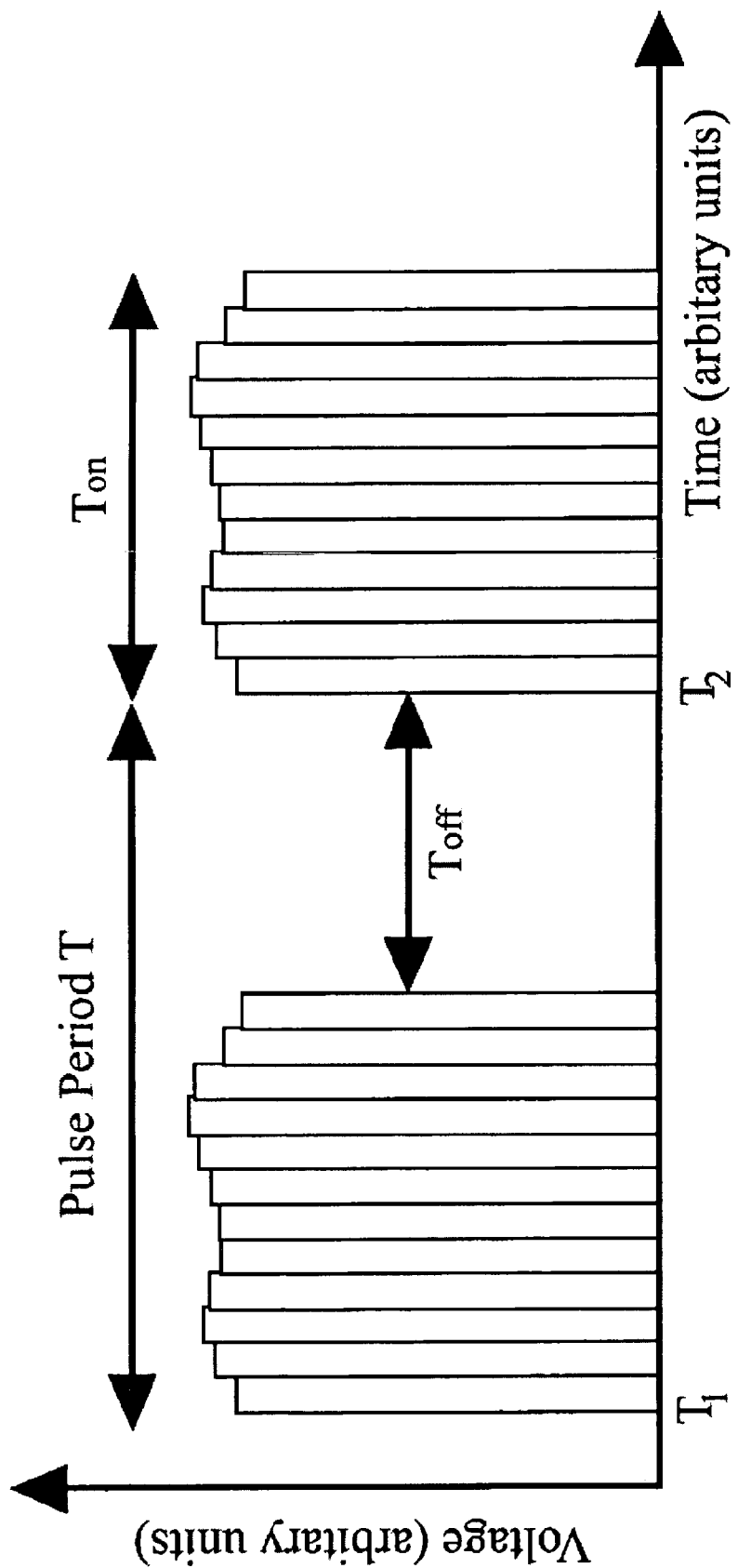
FIG. 1 is a graph illustrating an example of a pulse amplitude modulated signal showing a variation in amplitude of a voltage pulse having a time period T.

FIG. 1 shows an example of a Pulse Amplitude Modulation (PAM) signal with varying voltage levels. PAM is a commonly known method for encoding information in a signal by varying the amplitude of pulses and is used extensively in communication applications. In order to create a PAM signal, an unmodulated signal consisting of a continuous train of pulses of constant frequency, duration, and amplitude are required and during modulation the pulse amplitudes are changed to reflect the information being encoded. Referring to FIG. 1, the frequency of a PAM signal can be expressed as the reciprocal of the time period, T, between pulses and its duty cycle can be defined as the ratio of the time duration when the output pulse is "high", Ton, to the total time period, T. The properties of a PAM signal may be varied to suit particular embodiments of the invention such as in high speed, machine vision applications, or to optimise the illumination intensity output of the lights source(s).

It is well known that the human eye has a non-linear response to light intensity making it function more as a peak sensing device rather than an integrating device. Therefore, by using the PAM signal, it is possible to create an apparently brighter light source to the human eye by driving the light sources such as, light emitting diodes, for short periods of time with increased operating currents. The effect of this pulsing technique depends upon the light emitting characteristics of a particular LED at higher peak forward currents. However, the relative light emitting efficiencies of an LED can decrease as the peak forward current increases and so in general there is a practical limit to the usefulness of the pulsing technique.

Figure 2:
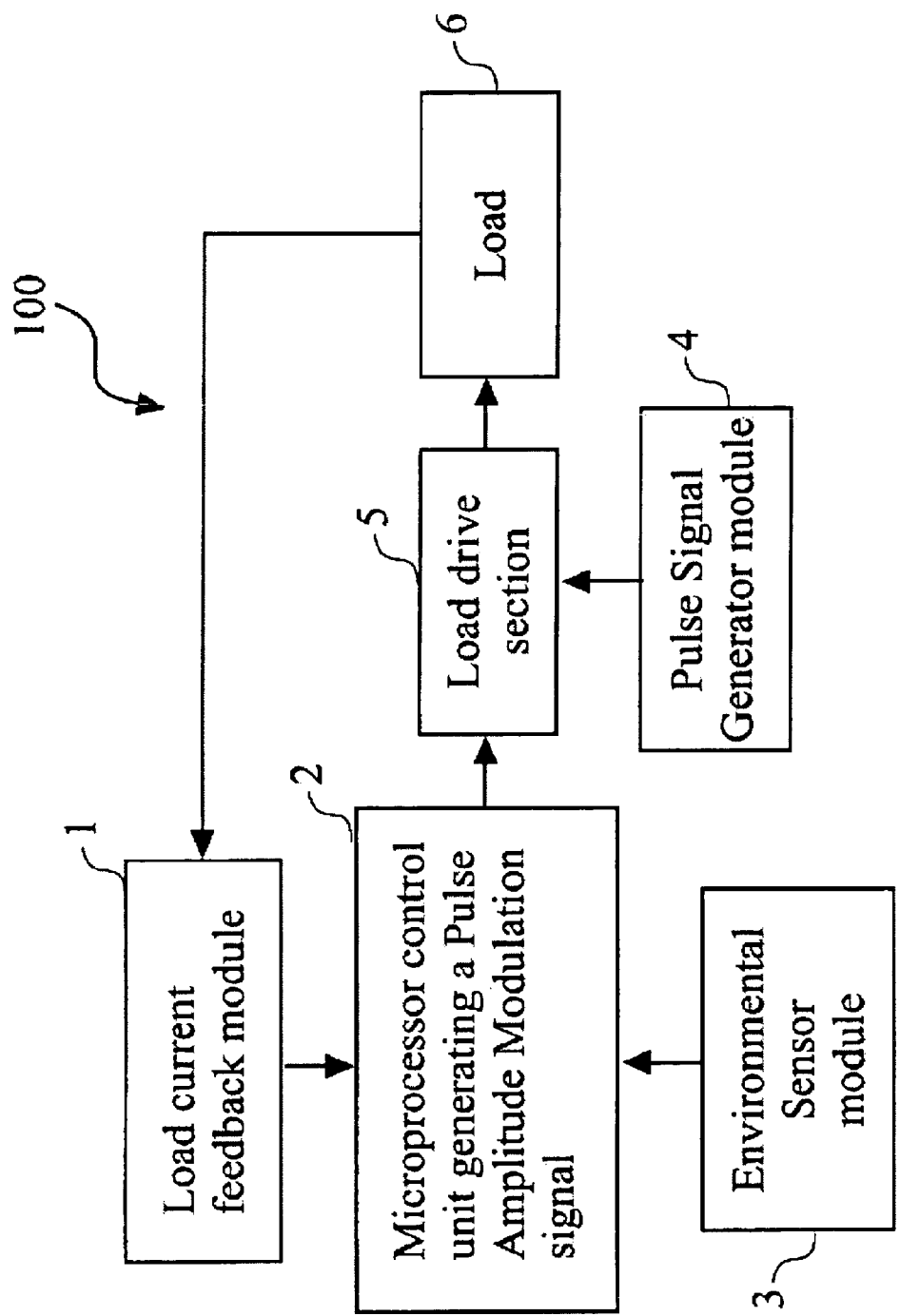
FIG. 2 is a block diagram of one embodiment of the illumination system according to the present invention illustrating a microprocessor control unit used to generate pulse amplitude modulated signals, an environmental sensor module, a pulse signal generator module, a load driver section, a load current feedback module and a load.

FIG. 2 shows a block diagram of an embodiment of an illumination control system (100) according to the present invention. The illumination control system (100) of the present invention provides a microprocessor control unit (2) used to control the illumination system and to generate an amplitude modulation control signal having inputs from an environmental sensor module (3) and a load current feedback module (1). A load drive section (5) has an input from both the microprocessor control unit (2) and the pulse signal generator module (4) and an output connected to a load (6). The load (6) then provides an output to the load current feedback module (1).

Figure 3:
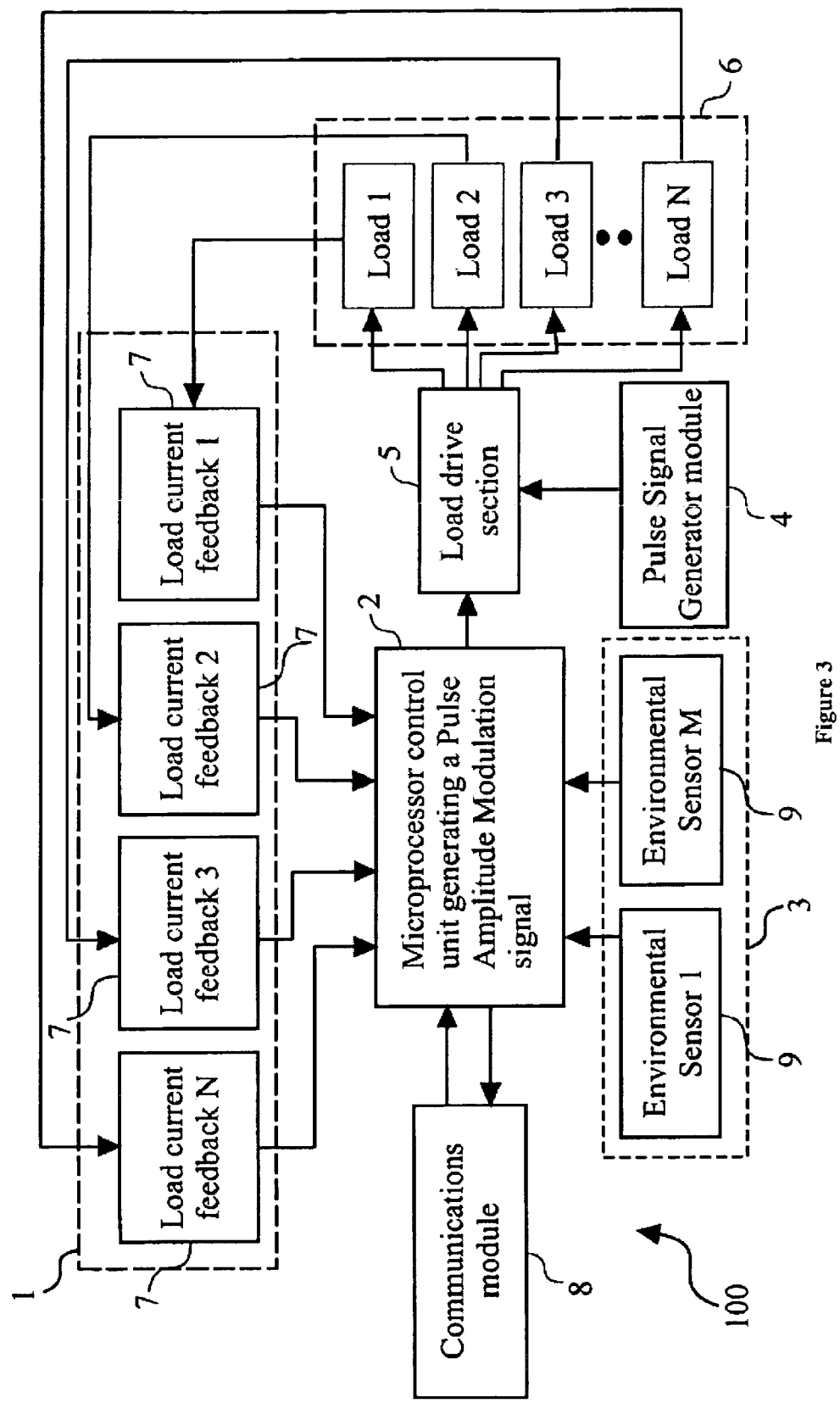
FIG. 3 is a block diagram of an alternative embodiment of the illumination system according to the present invention illustrating a microprocessor control unit used to generate pulse amplitude modulated signals, a communication module, a plurality of environmental sensor modules, a pulse signal generator module, a load driver section, a plurality of load current feedback modules and a plurality of loads.

Referring to the block diagram of FIG. 3, an alternative embodiment of the illumination control system (100) of the present invention is shown. In this embodiment, a communications module (8) provides a bi-directional data connection between the microprocessor control unit (2) and one or more external devices or controllers. In another aspect of the present embodiment, the environmental sensor module (3) includes a plurality (between 1 and M) of sensors (9) and the load drive section (5) includes a plurality of load drivers (not shown) used to drive a plurality (between 1 and N) of loads (6) and the load current feedback module (1) contains a plurality of load current feedback sensors (7).

Figure 4:
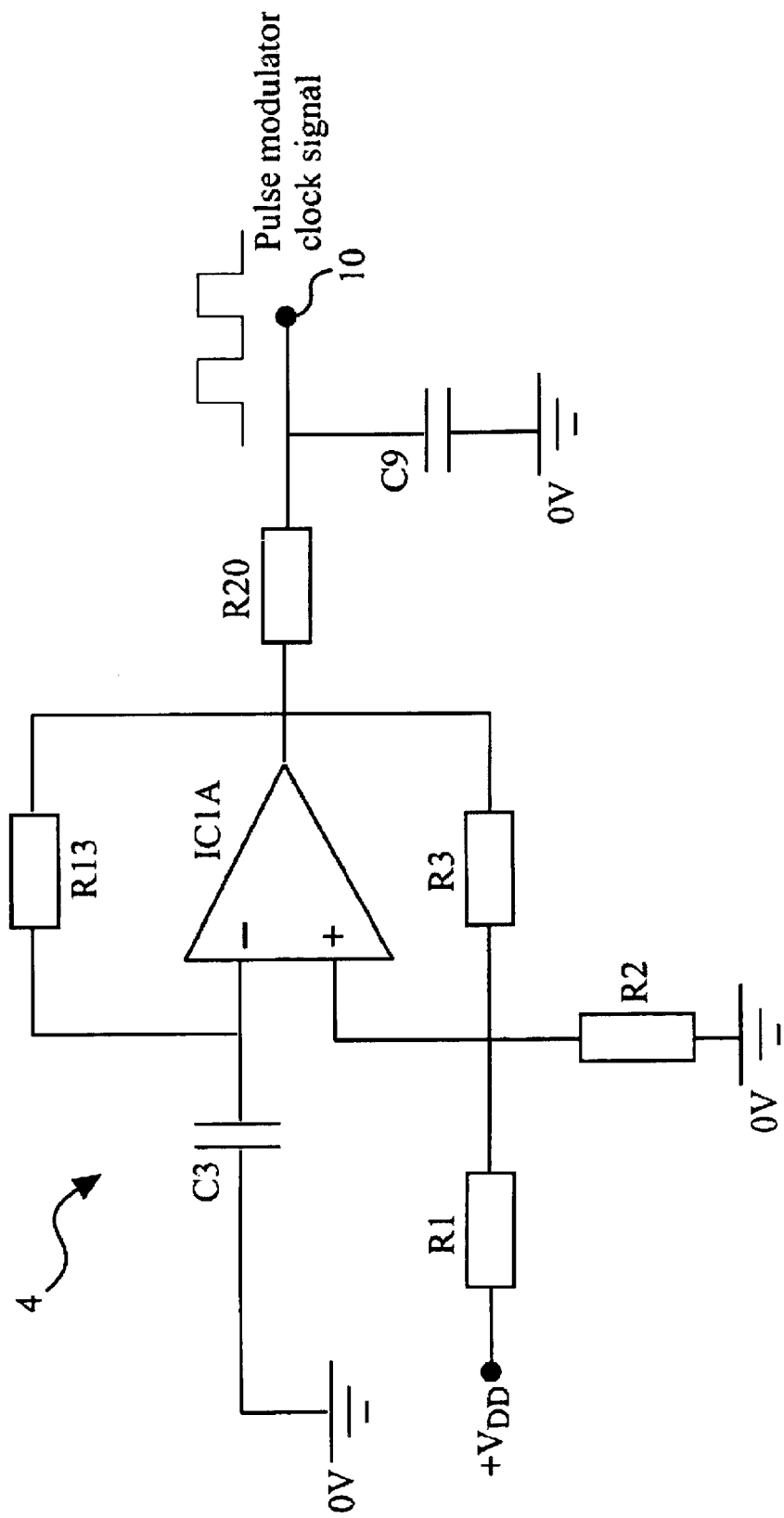
FIG. 4 is a stylised electrical circuit schematic of one embodiment of the pulse signal generator module.

FIG. 4 shows an embodiment of the pulse signal generator module (4), which provides a pulse modulator clock signal output (10) to the load drive section (5). The electrical schematic shown in FIG. 4 represents an astable multivibrator with a square wave output (10) based upon an operational amplifier integrated circuit (IC1A). The square wave oscillator circuit shown can have values of 100,000 Ohms for resistors R1, R2,R3, R13 and 1000 Ohms for resistor R20 and values of 10 nF and 100 nF for capacitors C3 and C9 respectively which produce an approximate duty cycle of 50% and a frequency of 1 KHz. The frequency of the oscillator may be modified to suit an application by choosing suitable values for capacitor C3 and Resistor R13. An example of a suitable operational amplifier would be one quarter of the LM324 low power quad operational amplifier from National Semiconductor Corporation. From the foregoing description and to those of skill in the art it will be appreciated that the pulse signal generator module (4) may be constructed from other electrical circuits including but not limited to, square wave oscillators based upon the 555 accurate timer integrated circuit, fixed frequency crystal oscillators and programmable crystal oscillators. In a further embodiment, the pulse signal generator module (4) may be based upon a 555 timer device such as the LM555C device from National Semiconductor Corporation. The LM555C device enables the frequency and duty cycle of the pulse amplitude modulation signal (16) to be varied with minimal electrical circuit component changes. In yet another embodiment, the pulse signal generator module (4) may be based upon a fixed frequency crystal or variable frequency, voltage controlled oscillators which possess high frequency stability of no greater than 0.001% for temperatures between 0 degrees and about 70 degrees centigrade. The voltage controlled oscillators may be programmed using a voltage potential to change the frequency of oscillation and the microprocessor control unit (2) could control the frequency of the pulse modulator clock signal (10) to enable the illumination control system (100) to be used for a variety of applications. Examples of suitable voltage controlled oscillators include the Vectron International series of Voltage Controlled Crystal Oscillators or the Epson America series of programmable crystal oscillators.

Figure 5:
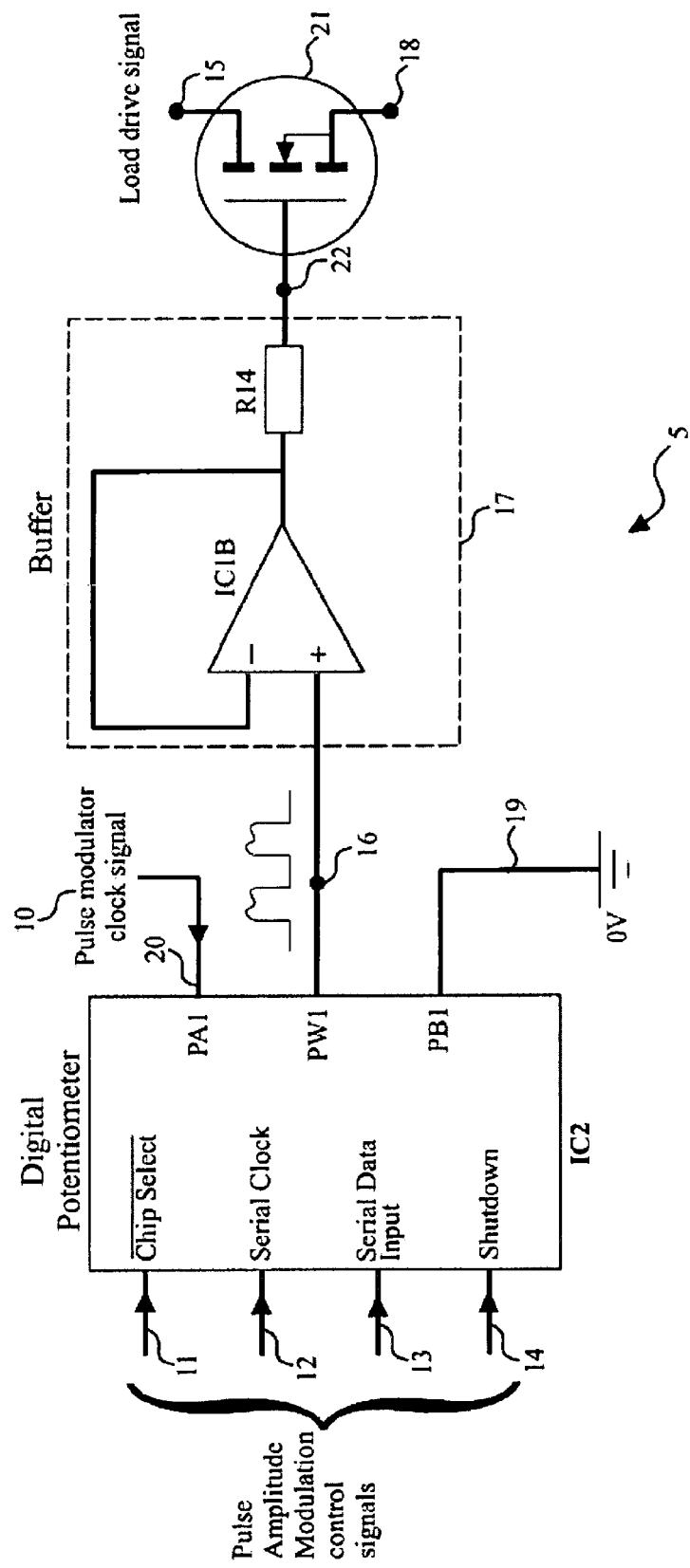
FIG. 5 is a stylised electrical circuit schematic of one embodiment of the pulse amplitude modulation load drive section.
Figure 6:
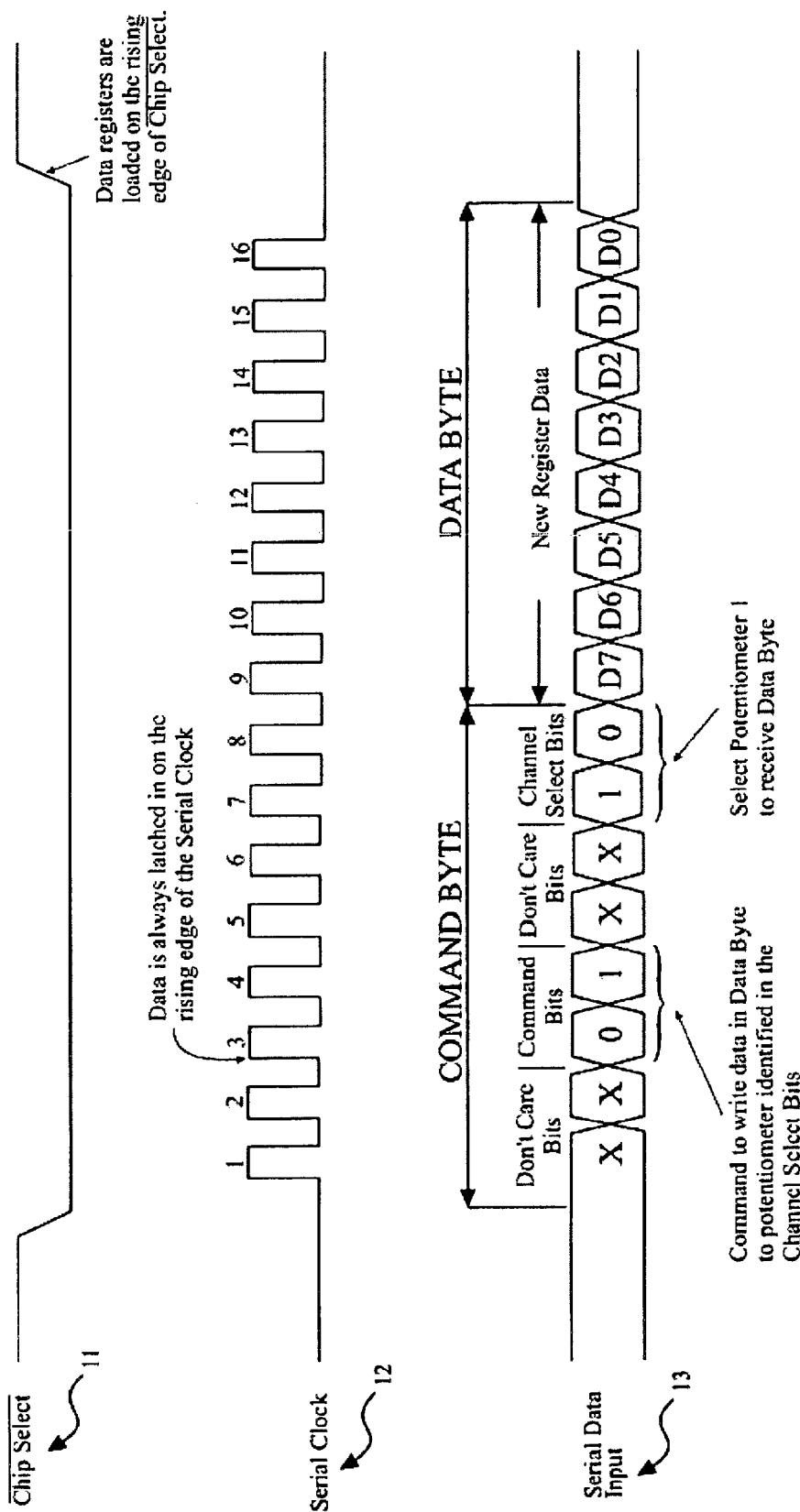
FIG. 6 is a timing diagram illustrating the chip select, serial clock and serial data input control signals required to programme a digital potentiometer.

FIG. 5 shows the electrical schematic of an embodiment of the load drive section (5) whereby a pulse amplitude modulation signal (16) is formed to drive a voltage controlled current source or load driver (21), such as an n-channel logic level Metal Oxide Field Effect Transistor (MOSFET) through a non-inverting amplifier buffer (17). The pulse amplitude modulation signal (16) is created by a programmable digital potentiometer (IC2), which receives as its inputs the pulse modulated clock signal (10) from the pulse signal generator module (4) and the amplitude control data (13) from the microprocessor control unit (2). An exemplary digital potentiometer is the 14 pin, MCP42100 dual digital potentiometer with SPI interface, available from Microchip Technology Incorporated. In the current embodiment the digital potentiometer is used as a voltage divider allowing the pulse amplitude modulation signal output voltage (16) to be a proportion of the input voltage defined by the potential difference between one terminal of the potentiometer (20) and the other terminal (19). The MCP42100 digital potentiometer is made up of two independent variable resistors with each having an 8-bit (256 discrete positions) data register that determines the wiper position. The resistance between the wiper and either of the resistor terminals varies linearly according to the value stored in the data register. Therefore, by selecting the appropriate value to be stored in the data register the amplitude (or voltage) of the pulse modulated clock signal (10) can be changed with a resolution of 19.5 mV, that is, 5V divided by 256 positions. The pulse amplitude modulation voltage signal (16) is modified by programming the digital potentiometer (IC2) using the SPI serial interface, which is connected to the microprocessor control unit (2). To programme the potentiometer with a new resistance value the microprocessor control unit (2) must set the Chip Select control line (11) low, and then clocking in a command byte followed by a data byte on the Serial Data Input control line (13). The command is executed when the Chip Select control line (11) is raised high. The command and data bytes are clocked into the digital potentiometer (IC2) on the rising edge of the Serial Clock (12) provided by the microprocessor control unit (2). FIG. 6 is a timing diagram illustrating the sequence for programming the digital potentiometer, where the command bits are set to instruct to write the data contained in the data byte to the potentiometer determined by the channel select bits, which are set to potentiometer 1. The shutdown control line (14) is controlled by the microprocessor control unit (2) and is used as a thermal cut-off function which suppresses the pulse amplitude modulation signal (16) from driving the load driver (21) and effectively switches off the load (6) thus, protecting the illumination control system (100) from operating in over-temperature conditions. Setting the shutdown control line (14) low will put the digital potentiometer (IC2) into a power saving mode and disconnect the potentiometer terminal (19). A non-inverting amplifier buffer (17) is employed in a voltage follower configuration to reduce load switching losses, reduce susceptibility to noise and provide isolation of the low impedance input load driver (21) from high impedance sources, such as the pulse modulator clock signal (10). The configuration of the buffer (17) provides an approximate voltage gain of one and a current gain of one and is commonly used to interface high impedance sources and low impedance loads.

Figure 7:
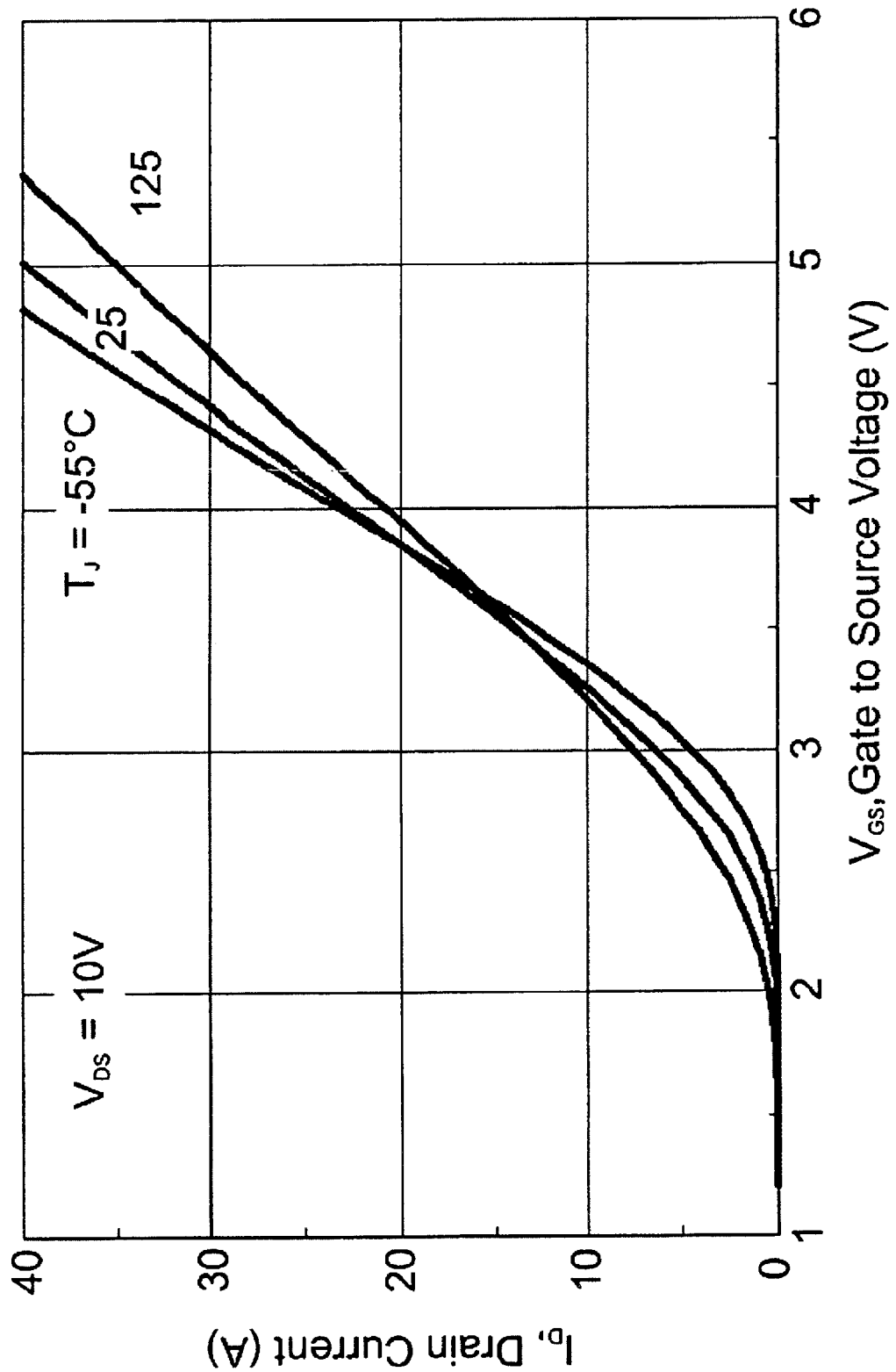
FIG. 7 is a graph illustrating the drain current variation against the gate voltage and temperature of a typical n-channel MOSFET.

Referring to FIG. 5, the conditioned, pulse amplitude modulation signal output from the buffer stage (17) will provide a gate voltage potential to the voltage controlled current source or load driver (21). Those of skill in the art will appreciate the detailed operations of n-channel MOSFET's however, by applying a voltage potential to the gate electrode (22) an output current will flow between the drain electrode (15) and the source electrode (18). The magnitude of the drain to source output current is dependant on the characteristics of the MOSFET but is generally proportional to the voltage potential presented at the gate electrode (22). Therefore, when the voltage potential at the gate electrode is reduced to zero, the output current is also reduced to zero effectively switching off the load(s) (6). Exemplary, n-channel MOSFET's include the TN family of enhanced mode MOSFET's from Vishay and the IRLMS1902 power MOSFET from International Rectifier. FIG. 7 illustrates the proportional variations in the drain current of a typical n-channel MOSFET with changes in the gate voltage and temperature. As illustrated, N-channel MOSFET devices have a negative temperature coefficient gate threshold voltage that decreases as the temperature increases. Therefore, as the ambient temperature increases the gate threshold voltage (or the pulse amplitude modulation control voltage (16)) must be reduced in order to maintain the required current settings to drive the load (6). The pulse amplitude control signal voltage (16) can be scaled by the microprocessor control unit (2) according to the current ambient temperature obtained from the environmental sensor module (3) and the thermal characteristics of the load driver MOSFET (21). The thermal characteristics of the MOSFET can be implemented as a look up table stored within the microprocessor control unit (2).

Figure 8:
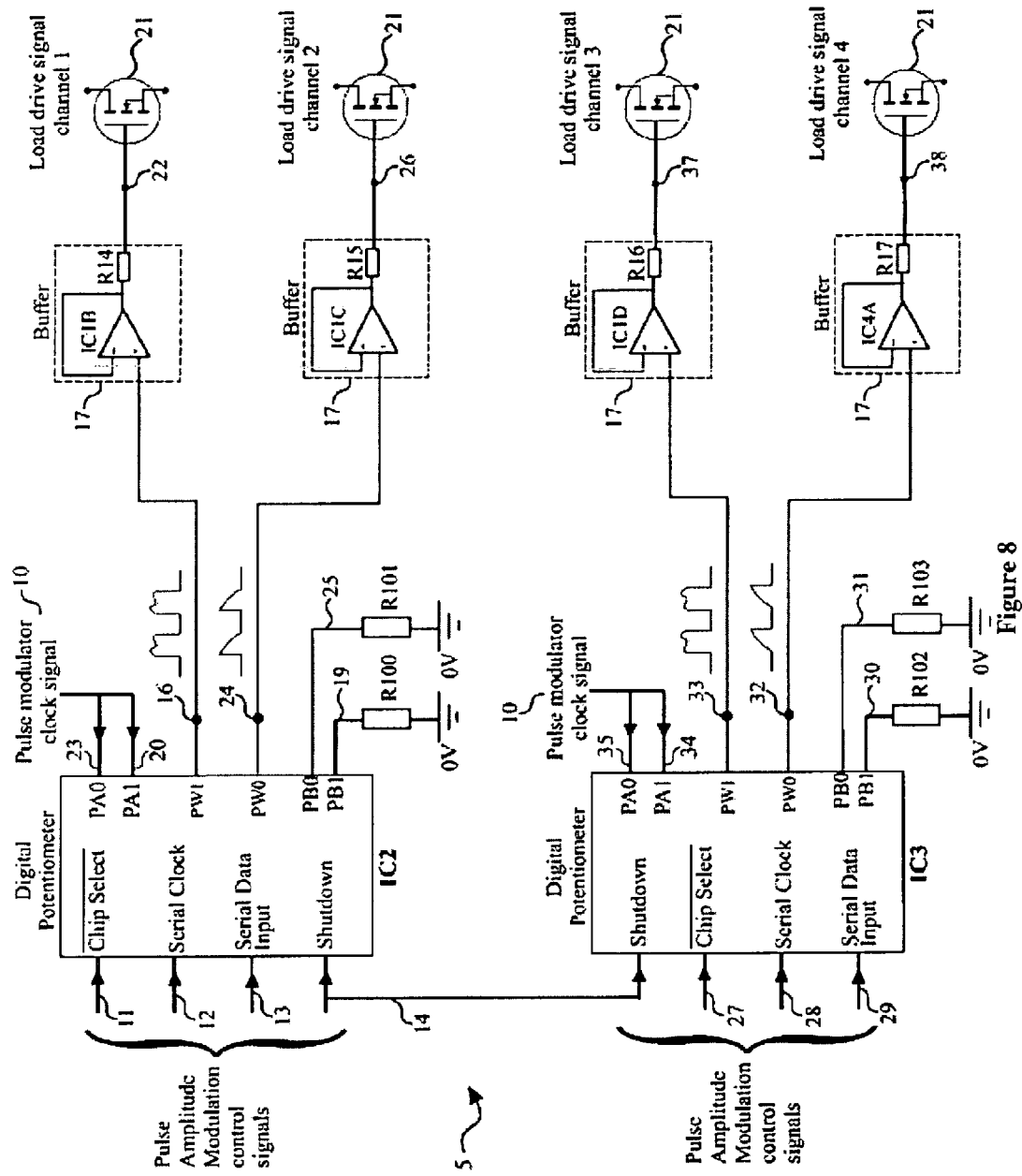
FIG. 8 is a stylised electrical circuit schematic of one alternative embodiment of the pulse amplitude modulation load drive section.

In the alternative embodiment of the load drive section (5), shown in FIG. 8, up to four separate loads (6) can be independently controlled by the microprocessor control unit (2). Two digital potentiometers (IC2 and IC3) each control two pulse amplitude modulation control signals (16,24,32, 33). The digital potentiometers have output voltage offset resistors (R100, R101, R102, R103) connected to each terminal A of the potentiometers to enable a linear relationship between the voltage out and the programmed data resistance value. These offset resistors with a value of approximately 2000 Ohms enable a data byte of zero, sent to the digital potentiometer, to correspond to a voltage output equivalent to just below the gate threshold voltage of 1.5V (ie; the load driver is switched off). The presence of the offset resistors increases the output voltage resolution of the digital potentiometers, enabling higher precision of the pulse amplitude modulation control signal (16) to be obtained.

Figure 9:
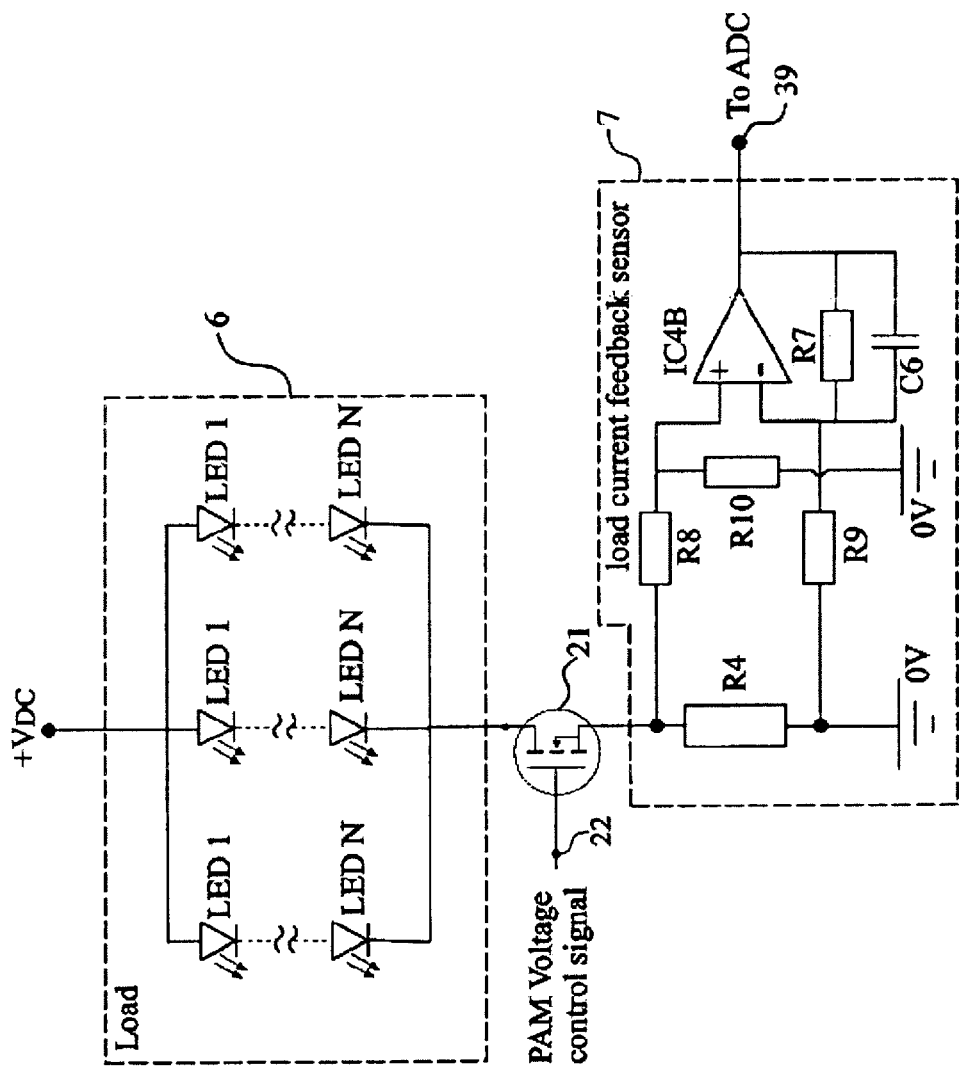
FIG. 9 is a stylised electrical circuit schematic of an embodiment of the load current feedback module of the present invention.

In typical operation the illumination control system (100) will be exposed to widely changing climate conditions that necessitate changes to the drive current through the load (6) to maintain light output requirements. For example, at low ambient temperatures (towards −40° C.), the electrical resistance of light emitting diodes increase causing the operating current and light output level to decrease correspondingly. At higher ambient temperatures (towards 70° C.), LED's require a reduction in operating current to avoid permanent damage or failure. In order to optimise the light output and to increase operational longevity, a current feedback sensor (7) is used to measure the current flowing from a power source (+VDC) through the load (6) and the load driver MOSFET (21). FIG. 9 shows the electrical schematic of an embodiment of a low-side, load current feedback sensor (7) within the load current feedback module (1). Referring to FIG. 9, a current sensing resistor (R4) is connected between the source terminal of the load driver (21) and circuit ground (0V). The low ohm, sensing resistor (R4) has a value of 0.01 Ohms and creates a small voltage potential across the resistor when load current flows. The voltage across the sensing resistor (R4) is applied to an operational amplifier (IC4B) using resistors R8 and R9 having values of 1K Ohms. The operational amplifier (IC4B) is configured as a differential amplifier with a capacitor (C6) used as an integrator to obtain an average current measurement over several pulse amplitude modulation clock (10) periods. The load current feedback sensor (7) produces an output voltage (39) corresponding to approximately 100 mV per ampere of load current when the value of resistors R7 and R10 are 15K Ohms and capacitor C9 is 1 micro Farad. The output voltage is then digitised into a 10-bit number using an analogue to digital converter (ADC) within the microprocessor control unit (2). The load current feedback sensor (7) accuracy is determined by the type of sensing resistor used and its tolerance. In the most common implementation, a discrete metallic resistor with zero temperature coefficient is used, either manganin or constantan.

Figure 10:
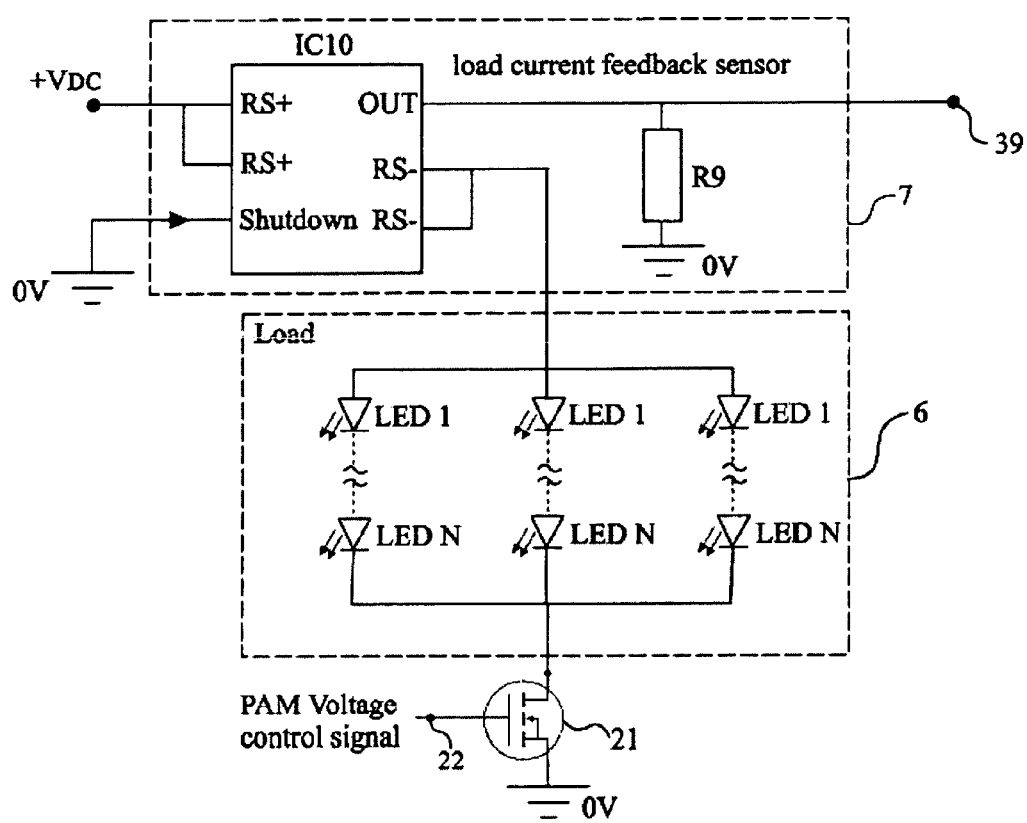
FIG. 10 is a stylised electrical circuit schematic of an alternative embodiment of the load current feedback module of the present invention.

In an alternative embodiment of the present invention, the load current feedback sensor (7) illustrated in FIG. 10 detects the load current using an accurate, high side current sensing integrated circuit (IC10). An example of a suitable current sensing integrated circuit is the MAX471 from Maxim Integrated Products Inc, which requires minimal external components and provides 2% accuracy over a wide temperature range. Referring to FIG. 10, the current sensing integrated circuit (IC10) has its inputs RS+ connected to the power source (+VDC) and its outputs RS− connected to the load (6). For normal current sensing operation, the shutdown pin should be connected to ground (0V). The load current feedback sensor (7) produces an output voltage (39) using an external resistor (R9). The output voltage can be scaled and is determined by the following formula:

$$R9 = Vout/(Iload \times 500 \ \mu A/A) \quad (1)$$

Where Vout is the desired full-scale output voltage;
Iload is the full-scale current being sensed;
R9 is the voltage-setting resistor.

In the foregoing embodiment, the current may be integrated by connecting a capacitance load to the OUT pin of the integrated circuit and the output voltage (39) can be digitised into a 10-bit number using an analogue to digital converter (ADC) within the microprocessor control unit (2)

In a specific embodiment of the present invention, an environmental sensor module (3) contains a temperature transducer such as a thermocouple, thermistor or integrated circuit (IC) temperature sensor to monitor the ambient temperature within the illumination control system (100). As described previously, the operation and performance of illumination systems utilising LED technology as the illumination source can vary significantly with changes in environmental temperature conditions. For example, the environmental sensor module (3) can use an IC temperature sensor like the DS1821 from Dallas Semiconductor, Inc. The DS1821 is a temperature sensor with an accuracy of ±1° C. over a temperature range 55° C. to 125° C. and requires no external components for measurement. The DS1821 operates in a master/slave configuration, using a 1 wire digital interface that requires only one digital port pin for communication. The DS1821 acts as a slave and connects to the master, the microprocessor control unit (2), using the 1 wire, bi-directional, digital interface with an external pull up resistor of 4.7K Ohms. The microprocessor control unit (2) can control the temperature sensor and read its temperature register which may be programmed to contain a continuous temperature reading in ° C. Alternative embodiments of the environmental sensor module (3) can include different transducers appropriate for the environmental condition to be monitored. Such transducers may measure the different forms of energy with respects to time or space, including Radiant, Mechanical, Thermal, Electrical, Magnetic and Chemical energy.

Figure 11:
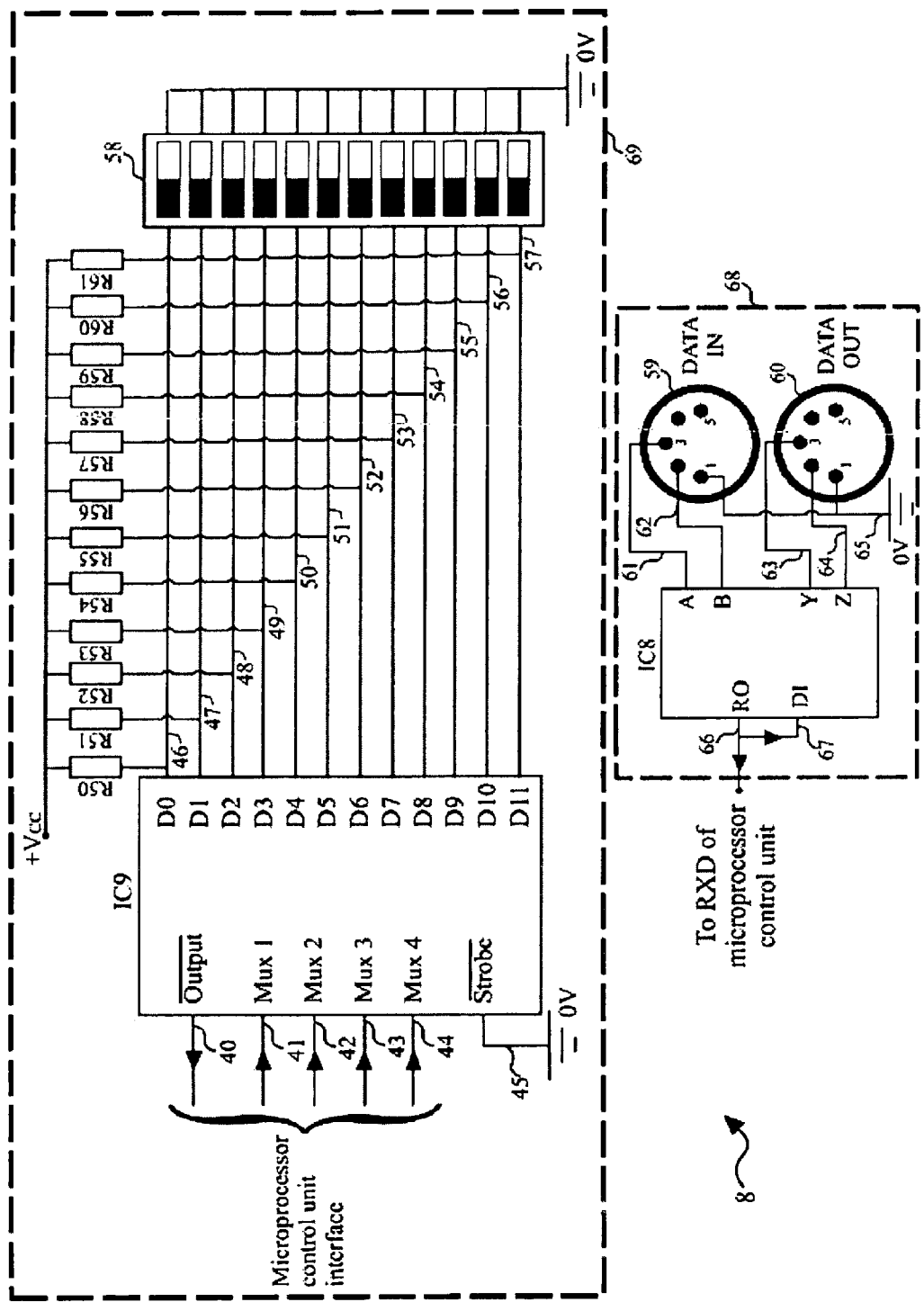
FIG. 11 is a stylised electrical circuit schematic of an embodiment of the communications module.

FIG. 11 illustrates an embodiment of a communications module (8) that provides a data connection interface between the microprocessor control unit (2) and an internal or external controlling device. The data connection interface can be understood to encompass any system that passes instructions between the microprocessor control unit (2) and a controlling device to control the functionality of the illumination control system (100) such as to change the colour or intensity of the light output amongst others. In embodiments of the invention, the communications module (8) may be equipped with a suitable transmitter, receiver or both to facilitate communication using different techniques such as radio frequency, infrared, electromagnetic or other suitable transmission methods. The embodiment of FIG. 11 incorporates two control methods, the first is an internal controller (69) enabling the microprocessor control unit (2) and thus the illumination control system (100) to act in a standalone mode according to preset instructions or to select an external control method, whilst the second implements an external control transceiver circuit (68).

The internal controller (69) comprises a twelve pin DIP switch (58) that may be mechanically set to control the illumination control system (100) using preset instructions stored in the microprocessor control unit (2). The outputs of the DIP switch (46 to 57) are connected to the corresponding inputs (D0 to D11) of a 16 to 1 multiplexer integrated circuit (IC9), which permits multiplexing from 16 inputs onto a single output (40) according to the 4-bit address held on the four selector control lines (Mux 1 to Mux 4). Suitable multiplexers, include the 74150 manufactured by Texas Instruments, USA. The microprocessor control unit (2) can set the selector control lines and hence retrieve the appropriate DIP switch input state on the output pin (40) using four output port control pins (41 to 44). When individual pins of the DIP switch (58) are closed, an electrical path is generated from the corresponding pins (46 to 57) on the multiplexer integrated circuit (IC9) to the circuit ground representing a data value of 0. Conversely, when individual pins are open, an electrical path is generated from the multiplexer IC (IC9) through corresponding pull up resistors (R50 to R61) to a voltage supply (+Vcc) and represents a data value of 1. Three of the DIP switch pins (D0, D1 and D2) are used to control the stand alone functions of the illumination control system (100) by providing up to 23, or 8, separate control effects. The other 9 DIP switch pins provide a means of determining preset values stored within the microprocessor control unit (2) providing 29, or 512, possible values for each of the control effects. One of the control effect switch permutations enables the illumination control system (100) to select an external control transmission method, if available, and to adopt a unique ID number, or address using the DIP switch pins D3 to D11 (providing 28 or 256 different addresses). To those of skill within the art, the electrical circuit schematic outlined in FIG. 1I may easily be adapted to provide up to 4096 different addresses by utilising the 16 input data channels of the multiplexer and using a 16 pin DIP switch. The embodiment shown in FIG. 11 utilises an external control transmission circuit (68), which incorporates a low power transceiver integrated circuit (IC8) for implementing RS-485 and RS-422 serial line standard. The RS-485 serial line standard provides bi-directional data communications on multipoint bus transmission lines enabling one or a plurality of microprocessor control units (2) to be connected together within a network and individually controlled using data from a central network controller such as a lighting desk or computer with appropriate hardware and software. The control data protocol may be in any form suitable to control the microprocessor control unit (2) however, a preferred embodiment would utilise the DMX-512 serial data protocol based upon the RS-485 standard and described in a United States Theatre Technology Incorporated publication entitled "DMX512/ 1990 Digital Data Transmission Standard for Dimmers and Controllers". For simplicity, details of the DMX protocol such as data packet description, header, start codes and the like have been omitted from this description, and will be well appreciated by those of skill in the art. An exemplary RS-485/RS-422 transceiver is the 8 pin, MAX488E from Maxim Integrated Products, USA which features full duplex communication and is slew-rate limited thus, reducing EMI and line reflections and allowing error-free data transmissions up to 250 kilobytes per second over distances of up to 4000 feet. The MAX488E transceiver (IC8) isolates the microprocessor control unit (2) from undesirable high voltages (±15 kV) that may cause damage due to electrostatic discharge (ESD) occurring on the transmission cables. A 5 pin XLR type socket connector (59) is used as the data input to the receiver section of IC8 where the data +ve line (6) on pin 3 of the XLR connector (59) connects to the data +ve input (A) of IC8 and the corresponding data –ve line (62) connects to the data –ve input (B). The transceiver (IC8) compares the electrical voltage potential on the data +ve (A) and data –ve (B) transmission lines and determines the logic state of the output of the receiver section (RO). If the potential voltage of the data +ve (A) input is greater than that present on data –ve (B) input by more than 200 mV then the output pin (RO) will be set in logic state high else the output pin (RO) will be set in logic state low. The data output (RO) from the receiver section of the transceiver (IC8) is sent as data to an input port pin (66) of the microprocessor control unit (2) where it is subsequently decoded according to the control protocol used. The data output (RO) can be connected to the data input pin (DI) of the transmission section of the transceiver (IC8) to enable the communications module (8) to be linked in a chain. In the foregoing embodiment, the MAX488E transceiver (IC8) is configured in a full-duplex communication mode enabling the external control transceiver circuit (68) to operate as a line repeater and increasing the cable distances between each communications module (8) or illumination control system (100). The data +ve output pin (Y) is connected to the data +ve line (63) on pin 3 of the data out 5 pin XLR connector (60) and the data –ve output (Z) of IC8 connects to the data –ve line (64) on pin 2 of the XLR connector.

Figure 12:
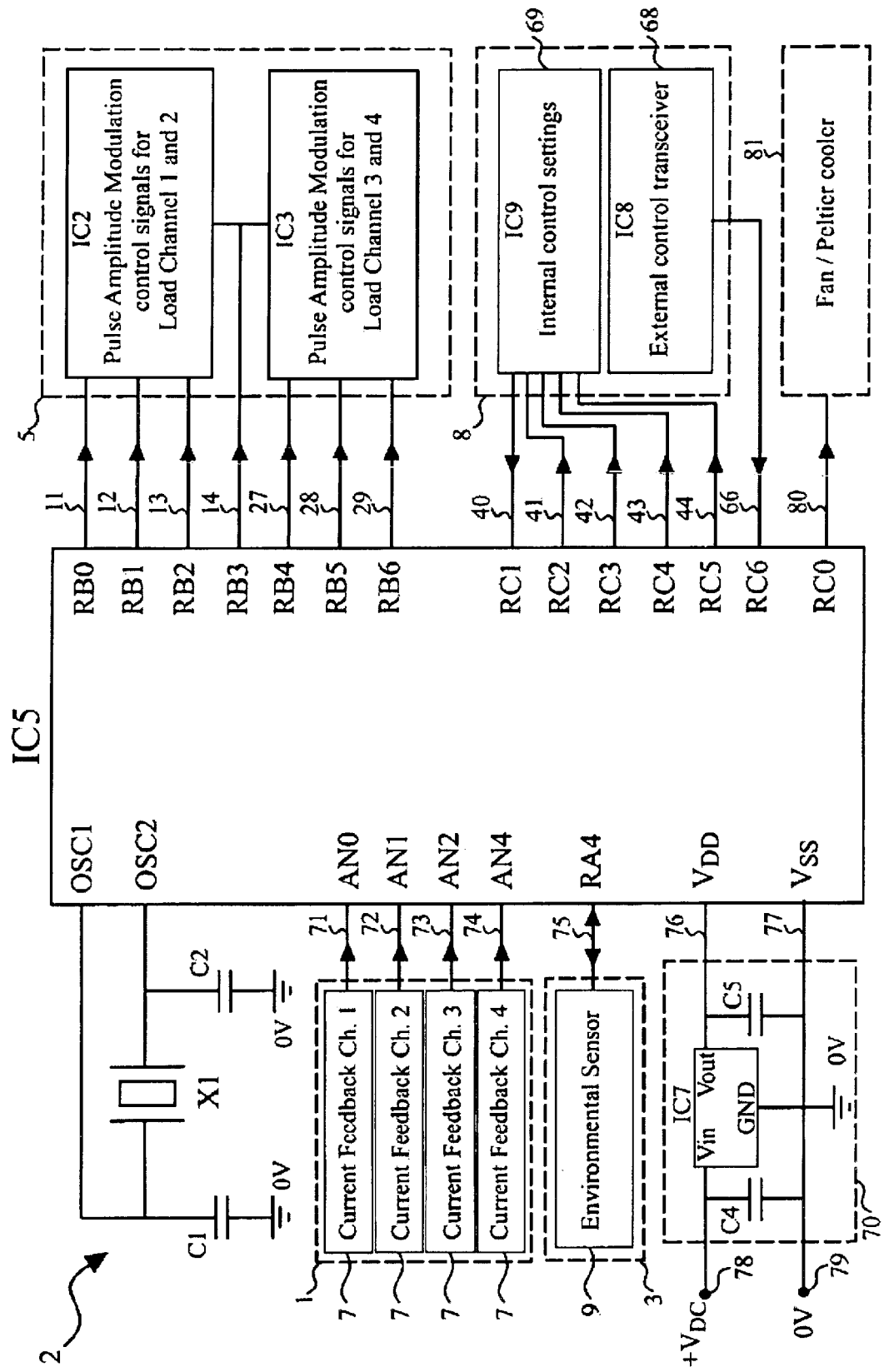
FIG. 12 is a stylised electrical circuit schematic of an embodiment of the microprocessor control unit of the present invention.

The structure and operation of the microprocessor control unit (2) will now be described. Referring to the partially stylised FIG. 12, the microprocessor control unit (2) consists of a microcontroller or microprocessor (IC5) that can perform software and hardware functions necessary to control and adapt the pulse amplitude modulation signal (16). The microprocessor (IC5) is preferably a PIC16F873 from the MICROCHIP brand, although almost any microprocessor can be used to perform the software functions necessary. The main function of the microprocessor (IC5) is to generate control signals (11–14,27–29) that control four independent pulse amplitude modulation signals (16) of uniform frequency but varying amplitude. This may be achieved by converting numerical data available from the load current feedback module (1), environmental sensor module (3) and the communications module (8).

The microprocessor (IC5) is powered through pins VDD (76) and the ground reference VSS (77), which are coupled to a 5 volt power source (70). The power source (70) includes a voltage regulator integrated circuit (IC7) and decoupling capacitors (C4,C5) having a value of 100 nF and is driven from a power supply (not shown) through lines (78,79). An exemplary voltage regulator is the 7805 from National Semiconductor Corporation. Those of skill within the art will appreciate that most microprocessors, and many other independently powered integrated circuits are rated to operate from a 5 volt power source. The clock frequency of the microprocessor (IC5) is set by using a crystal (X1) and two capacitors (C1,C2) to the oscillator pins (OSC1, OSC2). Preferably, the frequency of the crystal (X1) would be 20 MHz with capacitors C1 and C2 having a value of 1 nF.

The microprocessor (IC5) determines the function of the illumination control system (100) by sequentially reading and storing the status of the communications module (8) from the values set on the 12 pin DIP switch (58) using the multiplexer (IC9) arrangement explained previously. The settings will determine either the standalone function of the system or provide the unique DMX address and instruct the microprocessor (IC5) to detect data present, on the input pin (RC6) from the RS-485 transceiver (IC8), which is specifically addressed to it. The data presented by the communications module (8) provides a series of 8 bit words or bytes, which corresponds to a decimal number of 0 to 255, linearly representing the desired intensity from OFF to Full for each load (6). Whilst the microprocessor (IC5) is listening for new data from the communications module (8), it is running a series of routines designed to create the pulse amplitude modulation control signal outputs (11–14,27–29) for each of the loads (6). Individual channel registers within the microprocessor (IC5) store an 8 bit value which determines the amplitude setting for each load (6) channel. Since each register can take on a value from 0 to 255, these values create 256 possible quantisation levels of amplitiude voltage from 0% to 100%. The limit of the maximum voltage level of the pulse amplitude modulation signal (16) is dynamically adjusted by the microprocessor (IC5) to suit the environmental conditions, especially temperature of operation and is stored in the maxpam register. The limit of the maximum voltage setting is determined dynamically by three main factors (although other minor factors can also be taken into account), these being:

1) The thermal characteristics of the LED load current (see FIG. 13).
2) The characteristic of MOSFET gate to source voltage with temperature (see FIG. 7).
3) The thermal characteristic of the current feedback sensor.

Figure 13:
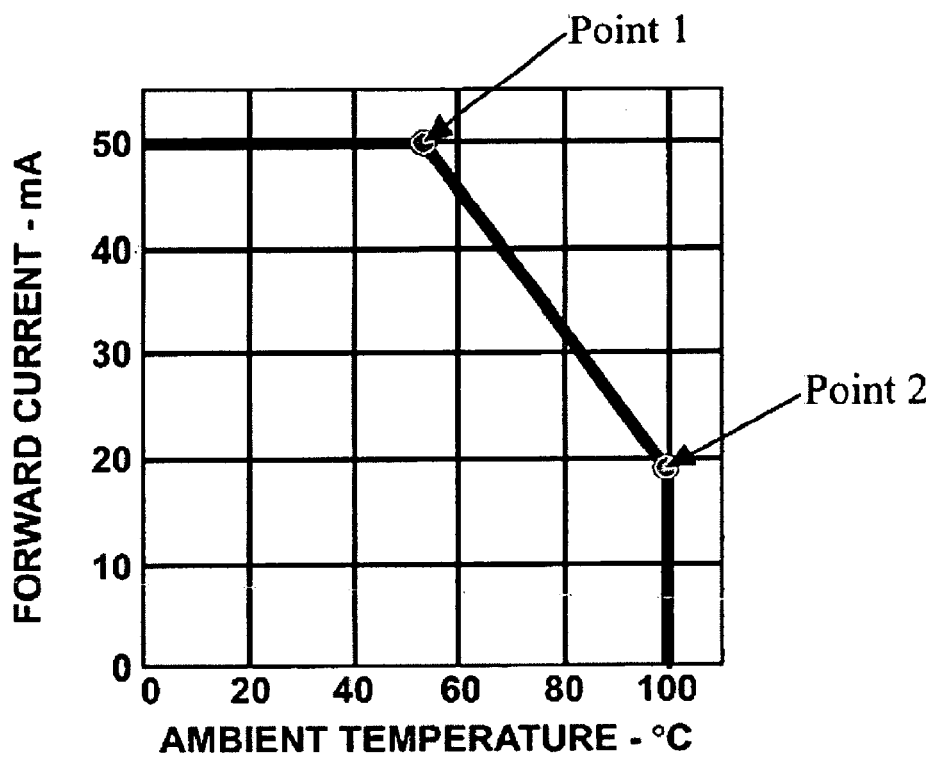
FIG. 13$a$ is a graph illustration the forward DC current verses the ambient temperature for a typical red, AlInGap LED.
Figure 13:
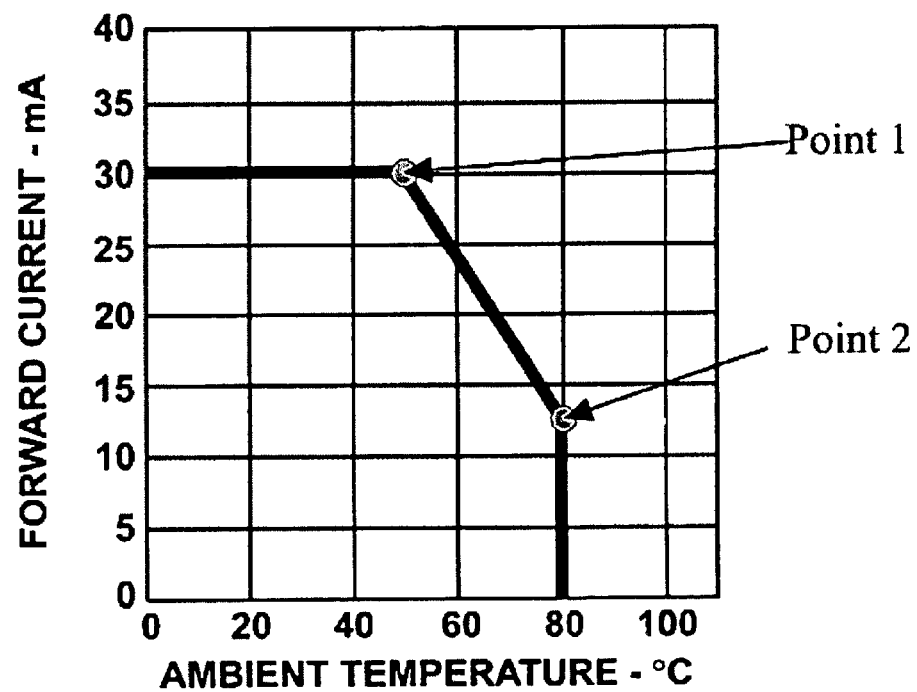

Referring to FIG. 7 the gate to source voltage VGS of the MOSFET varies with temperature and affects the drain currents $I_D$ through the load (6). For drain currents up to 5 A, the gate to source voltage curves are approximately similar and can be calculated by applying a gate voltage offset according to the measured temperature. This offset is stored in the microprocessor (2) onboard memory and is used to calculate the gate voltage required at the measured temperature. The actual drain current of the load (6) is dependant on the number and type of LEDs in the load (6) being driven and the network topology in which they are connected. FIG. 13(a) illustrates the variations of forward current of a single Red, AlInGap LED with temperature whilst FIG. 13(b) displays the same for a blue or green InGaN LED both from Agilent Technologies. In order for the microprocessor (IC) to compensate driving the load (6) for differences in ambient temperature the maximum current load through each LED must be calculated for a given temperature reading. The maximum DC current $I_{max}$ for a given LED without causing permanent damage can be determined by referring to FIG. 13 and the following equations:

For the case where $T_x > T_{point-1}$ and $T_x < T_{point-2}$ $$\text{Max DC current } I_{max} = I_{point-1} + \frac{(T_{point-1} - T_x) \times (I_{point-1} - I_{point-2})}{(T_{point-1} - T_{point-2})} \quad (2)$$

For the case where Tx<Tpoint−1

Max DC current $I$max=Maximum DC forward Current for LED (3)

For the case where Tx>Tpoint−2

Max DC current $I$max=0 mA (LED must be switched off) (4)

Where Tx is the measured ambient temperature;
Tpoint−1 is the temperature of point 1 of the LED characteristics in FIG. 13;
Tpoint−2 is the temperature of point 2 of the LED characteristics in FIG. 13;
Ipoint−1 is the forward current of point 1 of the LED characteristics in FIG. 13;
Ipoint−2 is the forward current of point 2 of the LED characteristics in FIG. 13

The data values calculated from the thermal characteristics for each channel of the load drive section (5), load (6) and load current feedback module (1) are used to form lookup tables stored in the onboard microprocessor memory (not shown) and to determine the pulse amplitude modulation control signal outputs (11–14,27–29) for each load (6). The maximum operating temperature for the loads (6) is determined by the lowest value of the maximum operating temperature of the LED characteristics shown in FIG. 13. Here for example, the InGaN has the lowest value and should not be operated above 80 degrees C. The microprocessor (IC5) communicates with the environmental temperature sensor (9) on pin (RA4) and requests the current temperature to determine the maximum load drive settings. The microprocessor (IC5) can be configured to switch off the load driver section (5) by setting the output pin (RB3) low, if the measured temperature is above the maximum operating temperature for the load (6). By setting the output pin (RB3) to a low state, the digital potentiometers (IC2, IC3) are shutdown and their output pins (16,24,32,33) connected to ground as described previously. This thermostat function provides a safety feature and prevents the load (6) from being permanently damaged due to high ambient temperatures. The load current feedback module (1) provides four independent analogue voltage signals (71 to 74) for each corresponding load channel to the analogue to digital convertor (ADC) pins (AN0, AN1, AN2 and AN4) onboard the microprocessor (IC5). The analogue voltage signal represents the actual current measured through each load (6) by the load current feedback sensor (7) and is converted into a 10 bit digital number. The load current feedback enables the microprocessor (IC5) to actively change the pulse amplitude modulation control signal outputs (11–14,27–29) for each load (6) and to ensure they operate within technical specifications. Although the ambient temperature and feedback current can be measured on a continuous basis, the values in practice, should not change significantly over short periods of time and so an interrupt timer can be set to count an interval of time which once elapsed, calls a routine to obtain the temperature and load current values. Once these values have been obtained the calculations are made to determine the required maximum voltage limit values for the pulse amplitude modulation control signal outputs (11–14,27–29).

The microprocessor control unit (2) may control a fan or other cooling device such as a peltier cooler by connecting the output pin (RCO) to the device (81) using line (80) and a switching device (not shown) such as a transistor or relay. A cooling device such as a fan may be used to provide airflow over the load (6) to reduce the measured ambient temperature at the load (6) enabling the microprocessor (IC5) to increase the intensity light output.

The PAM interrupt routine is implemented by programming a value between 0 to 255 for each of the load channels respective digital potentiometers (IC2, IC3) using the SPI serial interfaces connected to RB2 control line (13) and RB8 control line (29). The protocol for sending data from the microprocessor (IC5) to the digital potentiometers of the load drive section (5) has been described previously. When the microprocessor (IC5) receives new data, it reads the maximum setting from the maxpam register and determines the correct pulse amplitude modulation voltage that should be applied. The illumination output of each load (6) may be independently updated allowing the illumination control system (100) to quickly pulse as a strobe light does. There are three advantages of using such a uniform frequency and duty cycle, pulse amplitude modulation signal to drive each independent load (6). First, it allows each load (6) to quickly pulse/strobe such as a strobe light, here values within the individual channel registers are rapidly alternated between high and low intensity values. The second advantage is to "dim" each load (6) independently without noticeable load intensity output flicker by continuously applying a sequence of decreasing values within the individual channel registers. The third advantage is that each load (6) is pulsed at exactly the same frequency and duty cycle enabling exact illumination synchronisation between each load (6). The constant duty cycle enables the illumination control system (100) to be used within high-speed machine vision applications whereas other techniques that employ variable duty cycles (for example systems using pulse width modulation) may exhibit flickering or changes in colour depending on the status of the load signals.

From the foregoing description, it can be perceived that an illumination control system (100) with active feedback to optimise light intensity output and increase operating lifetimes throughout a wide range of operating temperatures can be constructed based upon a pulse amplitude modulation technique. If the illumination control system (100) contains at least three loads with each providing visible light at predetermined wavelengths any illumination or display colour can be generated by preselecting the light intensity that each load emits. The addition of a fourth load, providing a visible light at yet a different wavelength, enables an illumination or display colour to be optimised for chromaticity, efficacy, and colour rendition index. Further each load can emit light at any of 255 different intensities, depending on the amplitude of the pulse amplitude modulation signal, with a full intensity pulse generated by passing the maximum current through the LED. Further still, the maximum load intensity output can be conveniently programmed using a microprocessor that monitors the environmental conditions and adjusts the maximum allowable load current to suit. Load modules containing different light emitting characteristics may thereby be conveniently interchanged by simply changing the parameters stored in the microprocessor (IC5).

Figure 14:
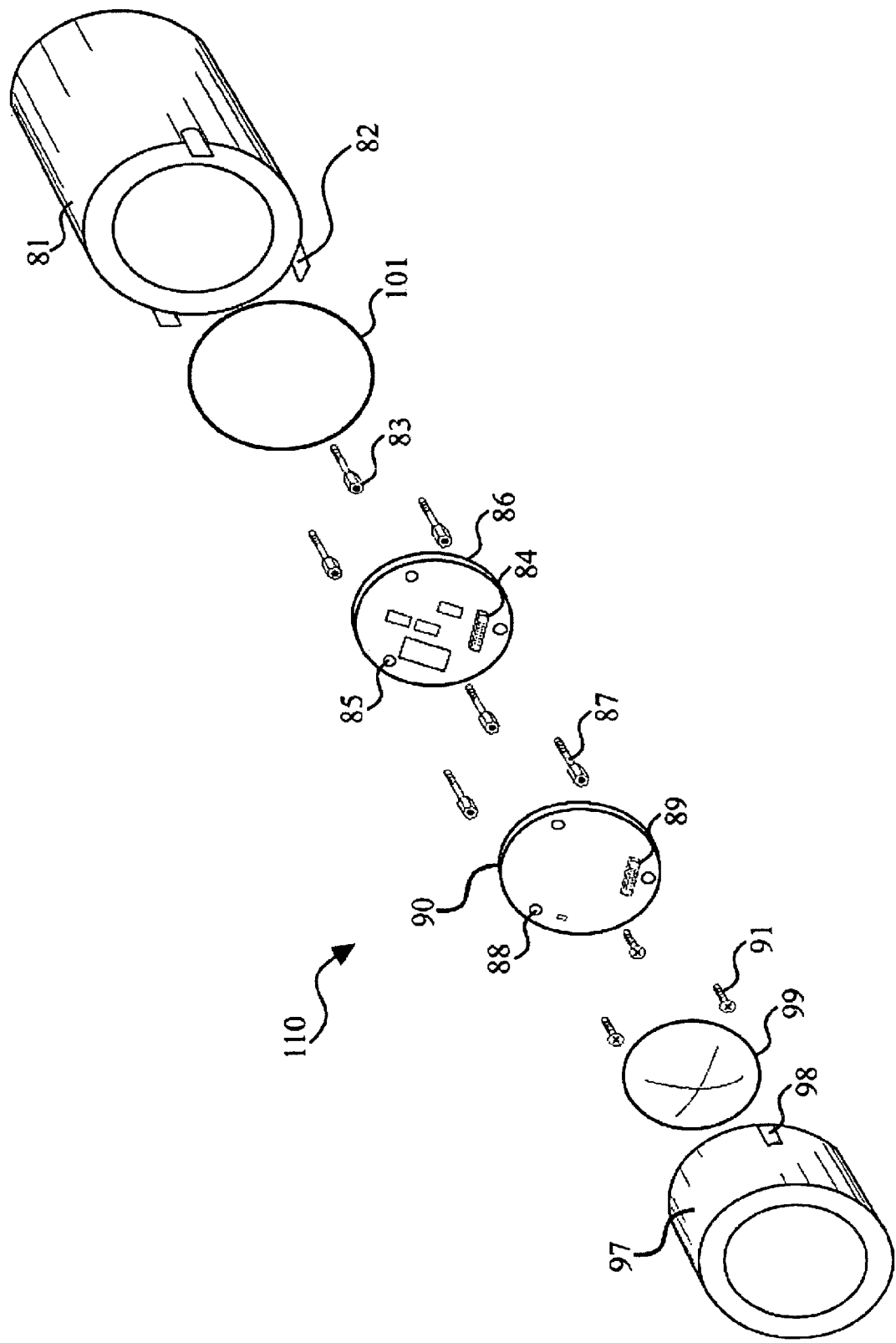
FIG. 14 illustrates an exploded view of one of the embodiments of an outdoor illumination assembly of the present invention.

A further embodiment of the invention can be used to provide an illumination system (110) suited for outdoor applications. Referring to FIG. 14, there is shown an exploded view of an illumination system of the present invention comprising of a cylindrical body section (81) that contains three clips (82) used to secure an 'O' ring (101) between the body section (81) and the light output section (97). The body section (81) also contains the power supply and external communication connectors (not shown) to enable power and external control commands to be passed to the illumination control system (100). The clips connect to corresponding raised areas (98) on the light output section (97) and enable the body section (81) to be connected to the light output section (97) in a watertight manner. Preferably, the material of the illumination system housing would be made from a heat conducting material such as aluminium to provide increased heat dissipation. The light output section (97) contains a sealed lens or cover plate (99) to enable the light output from the illumination system (110) to pass through it. The cover plate (99) can be constructed from a transparent material such as glass or plastic and may be changed to suit particular applications. It may also exhibit light diffusing/blending properties with one or both sides of the cover plate surfaces having rough structures to diffuse or mix blend the light from individual loads (6).

The illumination system (110) consists of a control driver module (86) and a light output module (90) which are mechanically secured using standard spacers (87) and securing screws (91). The control driver module (86) contains the microprocessor unit (2), load drive section (5), pulse signal generator module (4), load current feedback module (1) and communication module (8) circuitry along with a sixteen pin connector (84) to enable power and control signals to be passed between the control driver module (86) and the light output module (90). The connector (84) is preferably a standard Molex™ type connection system capable of carrying high load currents however in practice any connection system capable of carrying high current loads may be employed. Power is supplied to the illumination system (110) using a low voltage, 24V direct current power supply unit which is connected to the control driver module (86) using a two pin MoleX™ connector (not shown). Alternative embodiments may include different power supply units varying in voltage levels and current type including but not limited to standard battery cells or solar panels.

Figure 15:
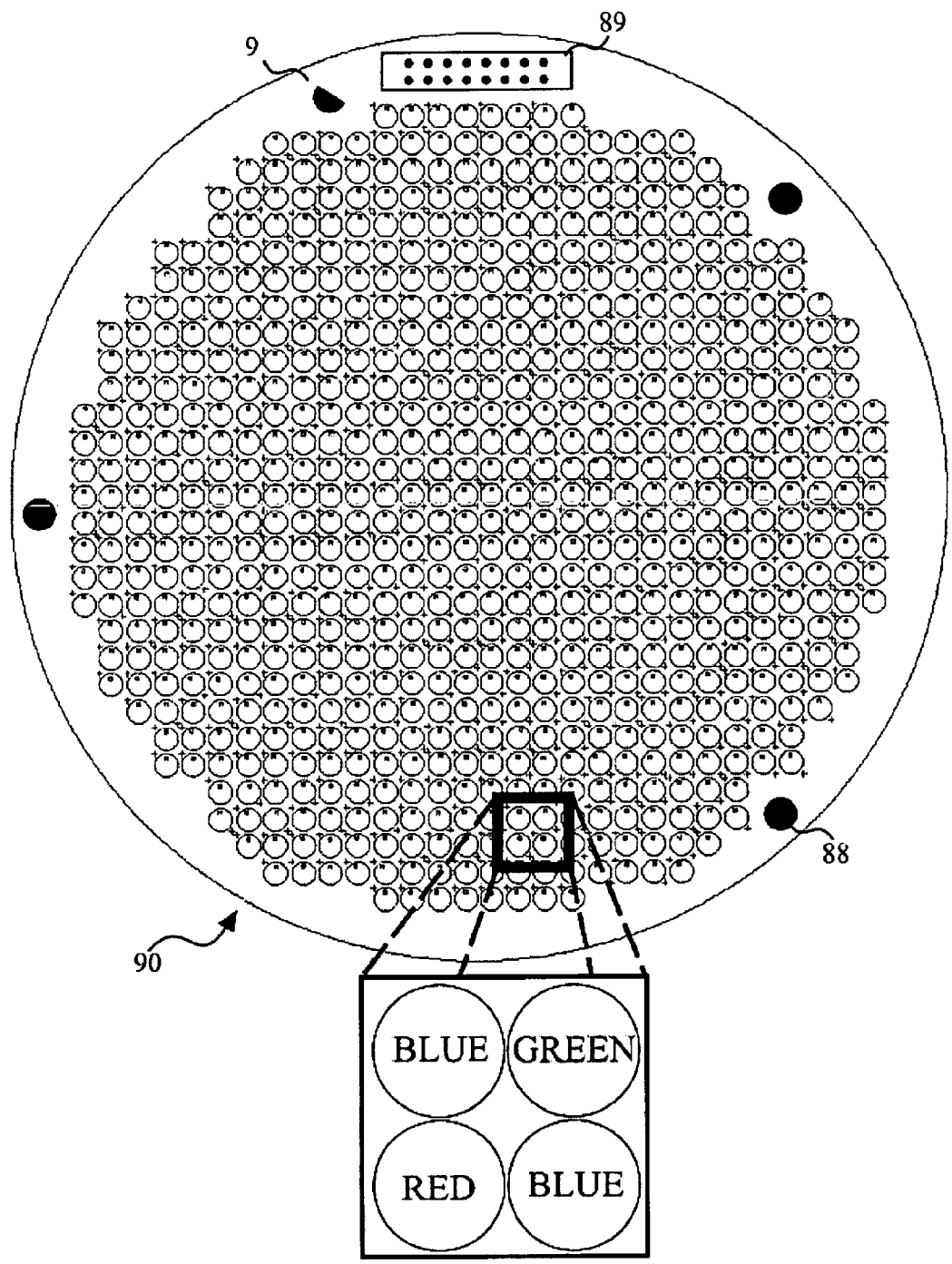
FIG. 15 illustrates an embodiment of the LED lighting module for three separate load channel colours representing red, green and blue.

The light output module (90) of the present embodiment is self-contained and may be configured to be interchangeable with any similarly constructed light module. The light output module (90) may contain a sixteen pin connector (89) to enable control and power electrical signals to be connected to the corresponding sixteen pin connector (84) located on the control driver module (86). The light output module (90) also contains an environmental temperature sensor which is located close to the LED sets, a twelve pin DIP switch (58) and a plurality of LED sets (not shown). The LED sets comprise of three independent load channels (6) containing red, green and blue primary colour LEDs arranged in a geometrical placement pattern. FIG. 15 depicts the light output module (90) containing the placement pattern of the LED primary colours. It is understood by those in the art that, in general, the illumination output intensity varies according to the LED type and that blue LEDs produce significantly less intensity compared to either red or green LEDs. Thus, for each green and red LED there must be at least two blue LEDs to enable an adequate and even colour output mix. Further geometrical arrangements of the LEDs may be considered depending on the number and type of loads (6) employed within the illumination system (110). The current embodiment utilises red LEDs obtained from Hewlett Packard Corporation whilst both blue and green LED types are available from Nichia America Corporation.

While the preferred embodiments of the present invention have been shown and described herein, it will be obvious that such embodiments are provided by way of example only. Numerous variations, changes and substitutions will occur to those of skill in the art without departing from the spirit and scope of the invention as defined in the appended claims.

What is claimed is:

1. A light emitting diode illumination system arranged to drive one or more light emitting diode light sources which comprises a control system including a microprocessor arranged to control a pulse amplitude modulated (PAM) voltage controlled current circuit, and a current feedback means for monitoring current driving the light source(s).

2. An illumination system according to claim 1, wherein said system is arranged to control one or more light emitting diode sources which are configured to emit light within different wavelength bands.

3. An illumination control system according to claim 2, wherein said light sources are, configured to emit substantially monochromatic light centered on at least three different wavelengths.

4. An illumination system according to claim 1, wherein the system further comprises means for modifying and controlling the pulse amplitude modulation signal timing period and duty cycle.

5. An illumination system according to claim 4, wherein the means for modifying and controlling the pulse amplitude modulation signal timing period and duty cycle comprises a micro-processor, discrete electrical component circuit, fixed or programmable crystal oscillator or integrated circuit timer.

6. An illumination system according to claim 1, wherein the pulse amplitude modulated voltage control current circuit comprises means for providing a voltage for modulating pulse amplitude.

7. An illumination system according to claim 1, wherein the current feedback monitor comprises a discrete electrical circuit or current sensing integrated circuit.

8. An illumination system according to any preceding claim, wherein said system further comprises a monitor for monitoring at least one environmental condition and said microprocessor is adapted to control said pulse amplitude modulated voltage controlled current circuit in response to the monitored condition.

9. The illumination system according to claim 8 wherein said monitor is selected from the group comprising radiant, mechanical, thermal, electical, magnetic and chemical monitors.

10. The illumination system according to claim 8 wherein said monitor is selected from the group comprising temperature sensors, displacement detectors, angular sensors, velocity sensors, strain sensors, acceleration sensors, photo-emissive sensors, photo-conductive sensors, photo-voltaic sensors, pressure sensors, flow transducers, radiation sensors, chemical sensors and gas detectors.

11. An illumination system according to claim 1, wherein said system further comprises a communications module providing a data connection interface to an internal or external controlling device.

12. The illumination system according to claim 1, wherein the system further comprises means for receiving an external signal and for controlling the frequency and duty cycle of the pulse amplitude modulation control signal in synchronism with the external signal.

13. The illumination system according to claim 1, the control system being constituted as a closed-loop, solid state, illumination control system.

14. A light emitting diode illumination system arranged to drive one or more light emitting diode light sources which comprises a control system including a microprocessor arranged to control a pulse amplitude modulated (PAM) voltage controlled current circuit, and a current feedback means for monitoring current driving the light source(s), wherein the pulse amplitude modulated voltage control current circuit comprises means for providing a voltage for modulating pulse amplitude, and wherein said means for providing a voltage comprises a programmable digital potentiometer that is provided as voltage provider.

15. A light emitting diode illumination system arranged to drive one or more light emitting diode light sources which comprises a control system including a microprocessor arranged to control a pulse amplitude modulated (PAM) voltage controlled current circuit, and a current feedback means for monitoring current driving the light source(s), wherein the system further comprises means for receiving an external signal and for controlling the frequency and duty cycle of the pulse amplitude modulation control signal synchronism with the external signal, and wherein a solid state camera system is arranged to pass the external signal.

16. A light emitting diode illumination system arranged to drive one or more light diode light sources which comprises a control system including a microprocessor arranged to control a pulse amplitude modulated (PAM) voltage controlled current circuit, and means for modifying and controlling the pulse amplitude modulation signal timing period and duty cycle.

17. A light emitting diode illumination system arranged to drive one or more light emitting diode light sources which comprises a control system including a microprocessor arranged to control a pulse amplitude modulated (PAM) voltage controlled current circuit, wherein the pulse amplitude modulated voltage control current circuit comprises means for providing a voltage for modulating pulse amplitude, and a programmable digital potentiometer is provided as voltage divider.

18. A light emitting diode illumination system arranged to drive one or more light emitting diode light sources which comprises a control system including a microprocessor arranged to control a pulse amplitude modulated (PAM) voltage controlled current circuit, and the pulse amplitude modulated voltage control current circuit comprises a communications module providing a data connection interface to an internal or external controlling device.

19. A light emitting illumination system arranged to drive one or more light emitting diode sources which comprises a control system including a microprocessor arranged to control a pulse amplitude modulated (PAM) voltage controlled current circuit, and said system further comprises means for receiving an external signal and for controlling the frequency and duty cycle of the pulse amplitude modulation control signal in synchronism with the external signal.

20. A light emitting diode illumination system arranged to drive one or more light emitting diode light sources which comprises a control system including a microprocessor arranged to control a pulse amplitude (PAM) voltage controlled current circuit, the control system being constituted as a closed-loop illumination control system.

* * * * *